United States Patent
Duan et al.

(10) Patent No.: US 11,556,841 B2
(45) Date of Patent: Jan. 17, 2023

(54) LOCATION DIMENSION REDUCTION USING GRAPH TECHNIQUES

(71) Applicant: Microsoft Technology Licensing, LLC, Redmond, WA (US)

(72) Inventors: Qing Duan, Santa Clara, CA (US); Xiaowen Zhang, Santa Clara, CA (US); Xiaoqing Wang, San Jose, CA (US); Junrui Xu, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 881 days.

(21) Appl. No.: 16/447,810

(22) Filed: Jun. 20, 2019

(65) Prior Publication Data

US 2020/0401931 A1  Dec. 24, 2020

(51) Int. Cl.
*G06N 20/00* (2019.01)
*G06F 16/29* (2019.01)
*G06F 16/901* (2019.01)
*G06K 9/62* (2022.01)

(52) U.S. Cl.
CPC ............. *G06N 20/00* (2019.01); *G06F 16/29* (2019.01); *G06F 16/9024* (2019.01); *G06K 9/6218* (2013.01)

(58) Field of Classification Search
CPC ........ G06N 20/00; G06N 5/003; G06F 16/29; G06F 16/9024; G06F 16/26; G06K 9/6218; G06K 9/6224
See application file for complete search history.

(56) References Cited

U.S. PATENT DOCUMENTS

2018/0367483 A1* 12/2018 Rodriguez ............ H04L 51/046

* cited by examiner

*Primary Examiner* — Robert G Bachner
(74) *Attorney, Agent, or Firm* — Schwegman Lundberg & Woessner, P.A.

(57) ABSTRACT

Technologies for generating a graph containing clusters of feature attribute values for training a machine learning model for content item selection and delivery are provided. The disclosed techniques include, for each entity, of a plurality of entities, a system identifies transitions from one geographic location to another geographic location. A graph is generated based on the transitions associated with each entity. The graph comprises nodes representing geographic locations and edges connecting the nodes. Each of the edges connects two nodes, represents a transition from one geographic location to another geographic location, and each edge represents an edge weight value that is based on frequencies of transitions between geographic locations represented by the two connected nodes. The system generates a plurality of clusters from the nodes based upon the edge weight value of each edge. The system includes the plurality of clusters as features in a machine learning model.

20 Claims, 7 Drawing Sheets

| 610 Record | 615 Raw Location | 620 Value for Node 405 (0 or 1) | 625 Value for Node 410 (0 or 1) | 630 Value for Node 415 (0 or 1) | 635 Value for Node 420 (0 or 1) |
|---|---|---|---|---|---|
| R1 | Node 405 | 1 | 0 | 0 | 0 |
| R2 | Node 405 | 1 | 0 | 0 | 0 |
| R3 | Node 415 | 0 | 0 | 1 | 0 |
| R4 | Node 410 | 0 | 1 | 0 | 0 |
| R5 | Node 420 | 0 | 0 | 0 | 1 |
| R6 | Node 415 | 0 | 0 | 1 | 0 |

640

| 645 Record | 650 Raw Location | 655 Value for Clustered Node 460 (0 or 1) | 660 Value for Clustered Node 470 (0 or 1) | 665 Value for Clustered Node 415 (0 or 1) |
|---|---|---|---|---|
| R11 | Node 405 | 1 | 1 | 0 |
| R12 | Node 405 | 1 | 1 | 0 |
| R13 | Node 415 | 0 | 0 | 1 |

LOCATION DIMENSION REDUCTION USING GRAPH TECHNIQUES

TECHNICAL FIELD

The present disclosure relates to reducing the number of dimensions for values of feature attributes used to train a machine learning model for content item selection and presentation.

BACKGROUND

Content management systems are designed to provide content items to users for consumption. Content items may represent content such as photos, video, job posts, news articles, documents, user posts, audio, and many more. Content management systems may implement various machine learning models to assist in determining which content items to present to users based upon content delivery objectives of the content providers. For example, content delivery objectives may be optimized for content delivery that results in maximizing duration of user sessions or maximizing click through rates.

The machine learning models are trained to select content items that satisfy the delivery objectives based upon the type of content items, the target users, and historical user data and historical user interaction data. For example, a machine learning model may select content items, representing job posts, for delivery based upon historical user data, such as user education, skills, current job title, current job location, current user residence, years of experience, and any other job-related user attributes. The machine learning algorithm may use the user profile data as training data of the content management system. Different attributes may be used as multiple features in a training data set for training the machine learning model. However, training machine learning models generally requires a training dataset that has representative data covering the possible values within a dimensional feature space. For example, if the dimensional feature space includes values for features covering users' residence location, employment location, job title, experience, education, training certificates, etc. then the representative training dataset will need to include data for users that have feature values covering each of the possible features in order to be statistically significant. In order to adequately train the machine learning model using high-dimensional feature space data, the sample size of the training data needs to be sufficiently large in order to avoid data from becoming sparse. Training data that is sparse with respect to the high-dimensional feature space may result in a poorly trained machine learning model that has not been trained with statistically significant data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 6 illustrates examples of transforming feature attribute values into records for training the machine learning model, in an embodiment.

DETAILED DESCRIPTION

Figure 1:
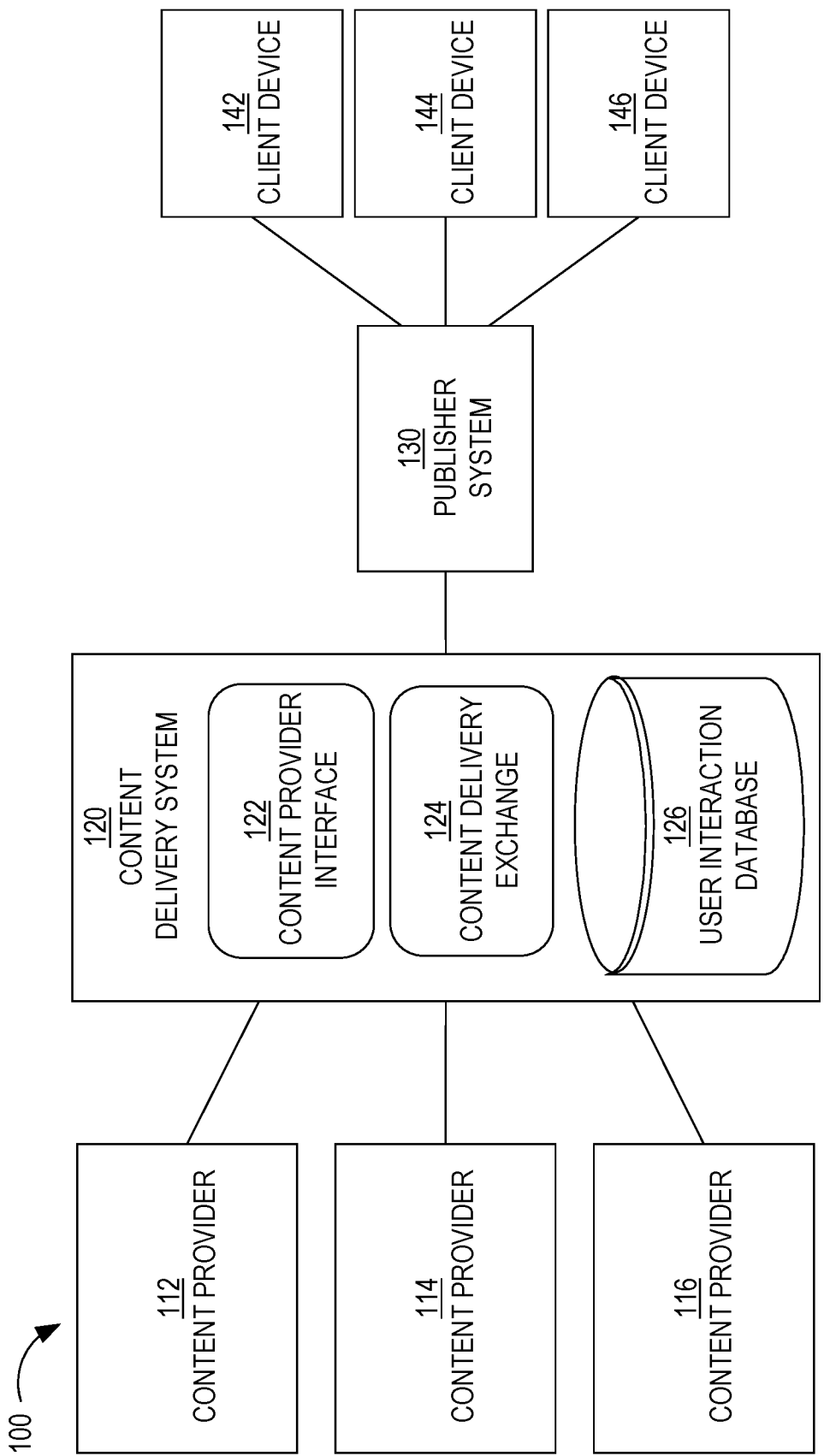
FIG. 1 is a block diagram that depicts a system for distributing content items to one or more end-users, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, a content management system implements a machine learning model when performing content item selection events that involve selecting one or more content items from a plurality of content items to transmit to a client device. The content item selection event may be in response to a request for content items to be presented as part of a feed of content items or any other user-based content item presentation service. The content item selection event relies on the machine learning model to output one or more content items for presentation based upon input that specifies an entity. An entity may refer to a user or a user's profile. For the purposes of this disclosure the terms entity, user, and user profile may be used interchangeably.

The content management system may use entity data from a plurality of entities to train the machine learning model for content item selection based upon a provided objective. The content management system may, for each entity of the plurality of entities, identify one or more transitions from one geographic location to another geographic location. A transition may occur when an entity value, for example job location, changes from one location to another location. Another example may include changing residence from one location to another location. Upon identifying transitions for each of the plurality of entities, the content management system may generate a graph based upon the one or more transitions associated with each entity of the plurality of entities. The graph may include a plurality of nodes and a plurality of edges connecting the plurality of nodes. Each node of the plurality of nodes may represent a geographic location and edges connecting two nodes may represent transitions from one geographic location, represented by one of the two nodes, to another geographic location represented by the other of the two nodes. Each edge may have an associated edge weight value that is based on frequencies of transitions between geographic locations represented by the nodes. The content management system may generate a plurality of clusters from the plurality of nodes based upon the associated edge weight value of each edge of the plurality of edges. Each cluster may represent two or more geographic locations that have been grouped together to represent a single geographic area. The graph, including the plurality of clusters, may be included as features in the machine learning model. By using the clusters and remaining nodes in the graph, the machine learning model may reduce the number of overall dimensions modeled. Thereby reducing the training time and training sample size for the machine learning model.

The disclosed approaches provide advantages over conventional solutions by implementing methods to reduce the number of dimensions within entity data to be modeled. By reducing the number of dimensions within the training dataset, the machine learning model may be able to be trained using a finite set of input data. Additionally, reducing the overall the number of dimensions within the input data reduces the amount of processing resources needed to train the machine learning model. For example, as the number of dimensions within a vector space increases, then the amount of processing time to train machine learning models increases; therefore, by reducing the number of dimensions by clustering geographic location values associated with entity features, the machine learning model may be trained using smaller training dataset sizes and the processing time and resources may be significantly reduced.

System Overview

FIG. 1 is a block diagram that depicts a system 100 for distributing content items to one or more end-users, in an embodiment. System 100 includes content providers 112-116, a content delivery system 120, a publisher system 130, and client devices 142-146. Although three content providers are depicted, system 100 may include more or less content providers. Similarly, system 100 may include more than one publisher and more or less client devices.

Content providers 112-116 interact with content delivery system 120 (e.g., over a network, such as a LAN, WAN, or the Internet) to enable content items to be presented, through publisher system 130, to end-users operating client devices 142-146. Thus, content providers 112-116 provide content items to content delivery system 120, which in turn selects content items to provide to publisher system 130 for presentation to users of client devices 142-146. However, at the time that content provider 112 registers with content delivery system 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 120.

Although depicted in a single element, content delivery system 120 may comprise multiple computing elements and devices, connected in a local network or distributed regionally or globally across many networks, such as the Internet. Thus, content delivery system 120 may comprise multiple computing elements, including file servers and database systems. For example, content delivery system 120 includes (1) a content provider interface 122 that allows content providers 112-116 to create and manage their respective content delivery campaigns and (2) a content delivery exchange 124 that conducts content item selection events in response to content requests from a third-party content delivery exchange and/or from publisher systems, such as publisher system 130.

Publisher system 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 130 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, publisher system 130 provides the requested content (e.g., a web page) to the client device.

Simultaneously or immediately before or after the requested content is sent to a client device, a content request is sent to content delivery system 120 (or, more specifically, to content delivery exchange 124). That request is sent (over a network, such as a LAN, WAN, or the Internet) by publisher system 130 or by the client device that requested the original content from publisher system 130. For example, a web page that the client device renders includes one or more calls (or HTTP requests) to content delivery exchange 124 for one or more content items. In response, content delivery exchange 124 provides (over a network, such as a LAN, WAN, or the Internet) one or more particular content items to the client device directly or through publisher system 130. In this way, the one or more particular content items may be presented (e.g., displayed) concurrently with the content requested by the client device from publisher system 130.

In response to receiving a content request, content delivery exchange 124 initiates a content item selection event that involves selecting one or more content items (from among multiple content items) to present to the client device that initiated the content request. An example of a content item selection event is an auction.

Content delivery system 120 and publisher system 130 may be owned and operated by the same entity or party. Alternatively, content delivery system 120 and publisher system 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 124, and that bids for space (on one or more publisher systems, such as publisher system 130) to present content items on behalf of multiple content providers. Thus, a bidder is another source of content items that content delivery exchange 124 may select for presentation through publisher system 130. Thus, a bidder acts as a content provider to content delivery exchange 124 or publisher system 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery system 120 through, for example, content provider interface 122. An example of content provider interface 122 is Campaign Manager™ provided by LinkedIn. Content provider interface 122 comprises a set of user interfaces that allow a representative of a content provider to create an account for the content provider, create one or more content delivery campaigns within the account, and establish one or more attributes of each content delivery campaign. Examples of campaign attributes are described in detail below.

A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select, or click on the set of content items, when a certain number of users purchase a product/service associated with the content delivery campaign or fill out a particular form on a website, or when a budget of the content delivery campaign has been exhausted.

A content delivery campaign may specify one or more targeting criteria that are used to determine whether to present a content item of the content delivery campaign to one or more users. (In most content delivery systems, targeting criteria cannot be so granular as to target individual members.) Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 124 receives, from a computing device, a request that does not satisfy the targeting criteria, then content delivery exchange 124 ensures that any content items associated with the particular content delivery campaign are not sent to the computing device.

Thus, content delivery exchange 124 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 124 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 130 may not satisfy targeting criteria of one content item of a campaign, the same content request may satisfy targeting criteria of another content item of the campaign.

Different content delivery campaigns that content delivery system 120 manages may have different charge models. For example, content delivery system 120 (or, rather, the entity that operates content delivery system 120) may charge a content provider of one content delivery campaign for each presentation of a content item from the content delivery campaign (referred to herein as cost per impression or CPM). Content delivery system 120 may charge a content provider of another content delivery campaign for each time a user interacts with a content item from the content delivery campaign, such as selecting or clicking on the content item (referred to herein as cost per click or CPC). Content delivery system 120 may charge a content provider of another content delivery campaign for each time a user performs a particular action, such as purchasing a product or service, downloading a software application, or filling out a form (referred to herein as cost per action or CPA). Content delivery system 120 may manage only campaigns that are of the same type of charging model or may manage campaigns that are of any combination of the three types of charging models.

A content delivery campaign may be associated with a resource budget that indicates how much the corresponding content provider is willing to be charged by content delivery system 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 124 receives triggers a content item selection event.

For example, in response to receiving a content request, content delivery exchange 124 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 124 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery system 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In one embodiment, content delivery exchange 124 conducts one or more content item selection events. Thus, content delivery exchange 124 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that operates content delivery system 120 conducts one or more content item selection events. In this latter embodiment, content delivery system 120 sends one or more content items to the other exchange, which selects one or more content items from among multiple content items that the other exchange receives from multiple sources. In this embodiment, content delivery exchange 124 does not necessarily know (a) which content item was selected if the selected content item was from a different source than content delivery system 120 or (b) the bid prices of each content item that was part of the content item selection event. Thus, the other exchange may provide, to content delivery system 120, information regarding one or more bid prices and, optionally, other information associated with the content item(s) that was/were selected during a content item selection event, information such as the minimum winning bid or the highest bid of the content item that was not selected during the content item selection event.

Event Logging

Content delivery system 120 may log one or more types of events, with respect to content item summaries, across client devices 152-156 (and other client devices not depicted). For example, content delivery system 120 determines whether a content item summary that content delivery exchange 124 delivers is presented at (e.g., displayed by or played back at) a client device. Such an "event" is referred to as an "impression." As another example, content delivery system 120 determines whether a content item summary that exchange 124 delivers is selected by a user of a client device. Such a "user interaction" is referred to as a "click." Content delivery system 120 stores such data as user interaction data, such as an impression data set and/or a click data set. Thus, content delivery system 120 may include a user interaction database 128. Logging such events allows content delivery system 120 to track how well different content items and/or campaigns perform.

For example, content delivery system 120 receives impression data items, each of which is associated with a different instance of an impression and a particular content item summary. An impression data item may indicate a particular content item, a date of the impression, a time of the impression, a particular publisher or source (e.g., onsite v. offsite), a particular client device that displayed the specific content item (e.g., through a client device identifier), and/or a user identifier of a user that operates the particular client device. Thus, if content delivery system 120 manages delivery of multiple content items, then different impression data items may be associated with different content items. One or more of these individual data items may be encrypted to protect privacy of the end-user.

Similarly, a click data item may indicate a particular content item summary, a date of the user selection, a time of the user selection, a particular publisher or source (e.g., onsite v. offsite), a particular client device that displayed the specific content item, and/or a user identifier of a user that operates the particular client device. If impression data items are generated and processed properly, a click data item should be associated with an impression data item that corresponds to the click data item. From click data items and impression data items associated with a content item summary, content delivery system 120 may calculate a CTR for the content item summary.

Optimized Graph Generation System

Figure 2:
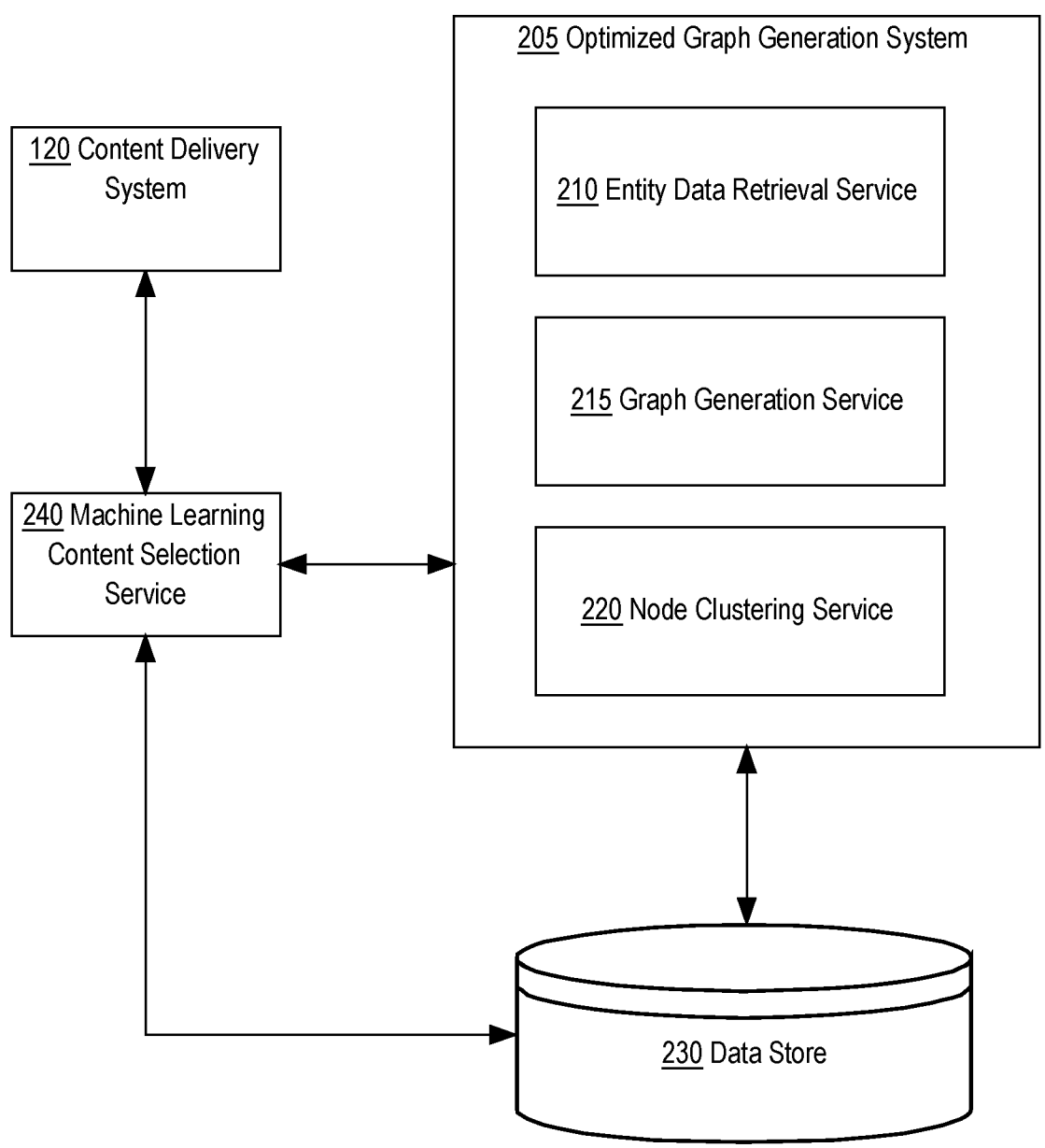
FIG. 2 is a block diagram of an example software-based system for generating an optimized graph of clustered features for training a machine learning model to provide content items during a content item selection event, in an embodiment.

FIG. 2 depicts a block diagram of an example software-based system for generating an optimized graph of clustered features for training a machine learning model to provide content items during a content item selection event. In an embodiment, an optimized graph generation system 205 implements a graph generation service and node clustering service to generate a graph of feature attribute values to be clustered in order to reduce the number of feature attribute values incorporated into the machine learning model.

In an embodiment, the optimized graph generation system 205 may be communicatively coupled to a machine learning content selection service 240. The machine learning content selection service 240 may represent a service that implements a machine learning model trained to provide one or more content items for presentation on client devices. Selection of the one or more content items may be based upon desired presentation objectives for the content items and a training dataset of data corresponding to the plurality of entities that use the content management system. For example, the training dataset may include feature attributes describing entity profile properties for the plurality of entities. Examples of desired presentation objectives for the content items may include, but are not limited to, causing new entity sessions, maximizing the duration of entity sessions, increasing engagement with the presented content items, and any other measurable objective. In an embodiment, the machine learning content selection service 240 may receive a training dataset from the optimized graph generation system 205 that includes multiple feature attributes of the plurality of entities, including combined feature attributes determined from a plurality of clusters generated from one or more graphs.

In an embodiment, the machine learning content selection service 240 may implement any machine learning technique to generate the machine learning prediction model. Examples of machine learning algorithms include random forest, decision tree learning, association rule learning, artificial neural network, support vector machines, and/or Bayesian networks. Embodiments are not limited to any particular type of machine learning technique or algorithm.

In an embodiment, the machine learning content selection service 240 may be communicatively coupled to the content delivery system 120 for the purposes of selecting one or more content items for a content delivery campaign. In another embodiment (not shown in FIG. 2), the machine learning content selection service 240 may be integrated as part of the content delivery system 120. In yet another embodiment, the machine learning content selection service 240 and the optimized graph generation system 205 may be integrated as part of the content delivery system 120.

In an embodiment, the optimized graph generation system 205 may include an entity data retrieval service 210, a graph generation service 215, and a node clustering service 220. In an embodiment, data store 230 may represent data storage implemented to store entities, such as user profiles, and entity profile property values for a plurality of entities. For example, the data store 230 may store user profiles for users, including the associated user profile property values.

In an embodiment, the entity data retrieval service 210 retrieves entity data, including entity profile property values, from the data store 230. Entity data and entity profile property values may refer to profile properties for each user represented in the plurality of entities. For example, profile properties may include, but are not limited to, current employer, previous employer, current job title, previous job title, job geo-location, job description, work experience, education, other employment or education certificates, current residence geo-location, connections to other entities, and any other profile properties that may be used to describe an entity. The entity data retrieved from the data store 230 may be used as input for generating one or more feature attribute graphs for the purpose of identifying and generating feature attribute value clusters.

Graph Generation Service

In an embodiment, the graph generation service 215 may use the entity data, retrieved by the entity data retrieval service 210, to generate one or more graphs that represent feature attribute values for one or more feature attribute types. The graph generation service 215 may select a particular feature attribute type to represent nodes with the graph. For example, job geo-location may be selected as the feature attribute type for the graph, where each node in the graph may represent a unique job location. Job locations may represent a city or town, zip code, specific neighborhoods within cities, states, countries, or any other defined geo-location. If the job location is defined as a city, then nodes within the graph may represent cities where entities' jobs are located. For instance, one node may represent San Jose Calif., while another node may represent Sunnyvale Calif. Determining which nodes to create within the graph may be based upon current and historical job locations of entities within the content management platform.

Figure 4A:
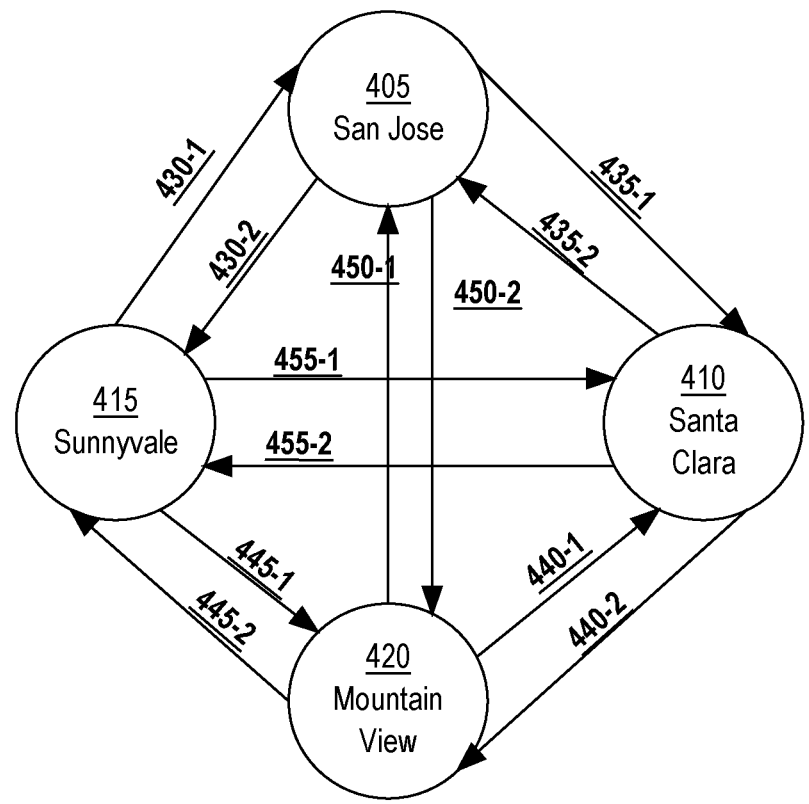
FIG. 4A is an example graph with a set of nodes and edges, in an embodiment.

FIG. 4A depicts an example graph with a set of nodes and edges. In an embodiment, nodes 405, 410, 415, and 420 each represent a location associated with entity jobs. For example, node 405 represents entity jobs located in San Jose Calif., node 410 represents entity jobs located in Santa Clara Calif., node 415 represents entity jobs located in Sunnyvale Calif., and node 420 represents entity jobs located in Mountain View Calif. Each of the nodes 405-420 may have an associated size value that represents a number of instances where entities had a job located at the location specified by the corresponding node. For example, if the total number of entities in the plurality of entities is 1000 and if 250 of the entities at some point in time (currently or previously) had a job located in San Jose (node 405), then the node size for node 405 would equal 250.

Graphs generated by the graph generation service 215 are not limited to job geo-locations for entities. In other examples, locations may represent current and previous residences of entities. In yet other examples, nodes of the graph may represent any feature attribute type including, but not limited to, employer, associated college or other attended educational institution, degree type, certified specialty, associated social groups, purchase history, and any other feature attribute associated with the plurality of entities.

In an embodiment, the graph generation service 215 may generate a plurality of edges that connect two nodes and represent a relationship between the two nodes. Using the job location example, where nodes represent job locations, edges between nodes may represent directional transitions between jobs where the transition resulted in a change from one job location to another job location. For instance, if an entity previously worked in San Jose and then transitioned to another job located in Sunnyvale, then the edge connecting the San Jose (node 405) to the Sunnyvale (node 410) may represent the transition for the entity from the San Jose job location to the Sunnyvale job location.

In an embodiment, edges connecting two nodes may have an associated edge weight value that represents an aggregated number of transitions by entities from a first node to a second node. For example, if the graph generation service 215 determines that 200 entities transitioned from jobs located in San Jose (node 405) to jobs located in Sunnyvale (node 410), then the edge weight value for the edge from San Jose (node 405) to Sunnyvale (node 410) would equal 200.

In a related embodiment of the edge weight value, job transitions by entities may be weighted based upon their recency. For example, a job location transition from San Jose to Sunnyvale that occurred within the last month may be given a higher weight than another job location transition from San Jose to Sunnyvale that occurred over a year ago. Applying edge weight values to transitions based on recency may be configurable based on days, weeks, months, or years. Additionally, edge weight values may be based on the type of job transition. For instance, job transitions for full-time employment may be given a higher weight than temporary jobs, internships, summer jobs, and/or volunteer work.

In an embodiment, edges between nodes may represent directional edges where each edge represents a one-way transition from a first node to a second node. Having directional edges between nodes means that the graph generation service 210 may generate an edge pair of two edges between two corresponding nodes, where a first edge represents a transition from the first node to the second node and a second edge represents a transition from the second node to the first node. Referring to FIG. 4A, edges 430-1 through 450-2 each represent an entity job transition from one node to another node. Edge 430-1 represents entity job transitions from node 415 (Sunnyvale) to node 405 (San Jose) and edge 430-2 represents entity job transitions from node 405 to node 415. Edge 435-1 represents entity job transitions from node 405 to node 410 and edge 435-2 represents entity job transitions from node 410 to node 405. Edge 440-1 represents entity job transitions from node 420 to node 410 and edge 440-2 represents entity job transitions from node 410 to node 420. Edge 445-1 represents entity job transitions from node 415 to node 420 and edge 445-2 represents entity job transitions from node 420 to node 415. Edge 450-1 represents entity job transitions from node 420 to node 405 and edge 450-2 represents entity job transitions from node 405 to node 420. Edge 455-1 represents entity job transitions from node 415 to node 410 and edge 455-2 represents entity job transitions from node 410 to node 415.

In an embodiment, the graph generation service 215 may pre-process entity data prior to generating the graph in order to remove feature attribute values that are not statistically significant. The graph generation service 215 may remove job locations values that represent very few instances of entity job locations. For example, if the graph generation service 215 determines that there are only 10 instances for the job location of Half Moon Bay, then graph generation service 215 may remove the 10 instances in order to avoid generating a node representing Half Moon Bay. In another example, job locations with very few instances may represent made up locations, such as Neverland or Hogwarts. This may occur if an entity purposely inputted their job/job location with a fictitious job or job location. Nodes that represent very small sample sizes may be too small to be clustered with other nodes based upon edge weight values and as a result the generated graph may contain several small nodes that are unable to be clustered. By removing job locations that represent very small sample sizes, the graph generation service 215 may eliminate outlier entity data for job locations that are grossly underrepresented and reduce the overall dimensions prior to generating the graph. In another embodiment, the graph generation service 215 may pre-process nodes of the graph after the nodes have been generated. For example, after generating the graph, the graph generation service 215 may analyze each node to determine whether each of the nodes meets a minimum size threshold.

In an embodiment, the graph generation service 215 may implement a node dropping threshold that defines a minimum size for each node in the graph. If a job location, or a newly generated node, does not meet the minimum size, as defined by the dropping threshold, then the graph generation service 215 may remove the job location or representative node from the graph. In another embodiment, if the job location or representative node from the graph does not meet the minimum size of the dropping threshold, then the graph generation service 215 may determine a nearby node, as defined by geographic distance, that is closest to the representative node and merge the representative node into the nearby node. For example, if the representative node, which does not meet the dropping threshold size, represents East Sunnyvale, then the graph generation service 215 may merge the East Sunnyvale node into the nearest node, which may be Sunnyvale (node 410). The result of the merge is that the size of the node 410 will increase by the size of the East Sunnyvale node as well as edges connected to node 410.

In an embodiment, the graph generation service 215 may implement an edge dropping threshold that defines a minimum edge weight value for edges in the graph. Edges with very small edge weight values may be too small for the node clustering service 220 to cluster nodes together. The edge dropping threshold may be used to remove edges with very small edge weight values in order to reduce processing iterations performed by the node clustering service 220. For example, if an edge between two nodes has an edge weight value of 5, which may be too small to determine whether clustering of the nodes should occur, then the graph generation service 215 may remove the edge such that the node clustering service 220 skips evaluating edges that are unlikely to produce meaningful clusters.

During graph creation the graph generation service 415 determines edges between nodes based upon a job transition. If an entity transitions from a first job located in Sunnyvale (node 410) to a second job also located in Sunnyvale (node 410), then the graph generation service 415 may generate an edge connecting node 410 to itself. In an embodiment, the graph generation service 215 may remove edges connecting nodes to themselves during the pre-processing phase.

Node Clustering Service

In an embodiment, the node clustering service 220 analyzes the nodes and edges in a graph generated by the graph generation service 215 and identifies nodes that may be clustered to generate a plurality of clusters based upon the edges connecting the plurality of nodes. A cluster may represent two or more nodes that have been combined to represent a new single node. By combining multiple nodes into a cluster, the node clustering service 220 may be able to reduce the overall number of entity feature attribute values and thus reducing the level of granularity of entity feature attribute values to be provided to the machine learning content item selection service 240. By reducing the overall number of entity feature attribute values in the graph, the overall dimensions are reduced thereby generating a graph that represents a finite data set that may be used to train the machine learning model using less resources and time than would have been needed if trained using a full set of entity feature attributes.

In an embodiment, the node clustering service 220 determines which nodes to cluster by analyzing edge weight values associated with directional edges connecting pairs of nodes to determine whether the difference between corresponding edge weight values is below a clustering threshold that defines whether nodes should be clustered. If the difference between edge weight values of opposing edges is below the clustering threshold, then the job location attribute values between the two correspond nodes connected by the opposing edges may not be a statistically significant factor when an entity determines whether to change their respective job. If however, the difference between the edge weight values of opposing edges is above the clustering threshold, then the job location attribute value between the two correspond nodes may be statistically significant in determining potential job changes. The node clustering service 220 may evaluate the statistical significance of the job location attribute value by calculating the difference between corresponding edge weight values of opposing directional edges. For example referring to FIG. 4A, if edge 430-1 (job transitions from node 415 to node 405) has an edge weight of 100 and edge 430-2 (job transitions from node 405 to node 415) has an edge weight of 120, then the difference in edge weights between edge 430-1 and edge 430-2 is 20 (absolute value of 100–120). If the clustering threshold is set to 25, then the difference between edges 430-1 and 430-2 is below the clustering threshold and as a result the node clustering service 220 may combine node 405 and node 415 into a cluster. When the difference in edge weight values is below the clustering threshold, that may indicate that job transitions by entities between two job locations are sufficiently close in value that entities may not be factoring in job location differences when deciding to make a job transition. As a result the node clustering service 220 may cluster these job locations together for the purpose of reducing the overall dimensionality of the graph.

In an embodiment, the clustering threshold value may be a configurable value that is determined based upon the overall desired number of nodes in the graph, the number of entities within the content management system, the total number attribute values used to train the machine learning model, and any other factor related to the size and makeup of the training data. For example, if it is desired to have a graph with fewer nodes, then the clustering threshold may be set to a higher value in order to increase the number of clusters. Conversely, if it is desired to have a graph with many nodes, then the clustering threshold may be set to a lower value in order to trigger clustering when the difference in edge weight values is very small.

In an embodiment, calculating differences between edge weight values may be based on an absolute difference between corresponding edge weight values. For instance, determining whether two nodes should be combined into a cluster may be represented as $$abs(\alpha_{A\text{-}B} - \alpha_{B\text{-}A}) < \gamma$$

where:
$\gamma$ represents the configured clustering threshold value.
$\alpha_{A\text{-}B}$ represents the edge weight value for the directional edge from node A to node B.
$\alpha_{B\text{-}A}$ represents the edge weight value for the directional edge from node B to node A.
If the absolute difference of edge weight values for edges $\alpha_{A\text{-}B}$ and $\alpha_{B\text{-}A}$ is below $\gamma$, then the job location attribute value, with respect to nodes A and B, does not statistically factor into a job change decision and therefore nodes A and B may be clustered in order to reduce the total number of dimensions for the graph.

In other embodiments, the clustering threshold value may be based upon a percentage of the corresponding edge weight values of a pair of directional edges. That is, the clustering threshold value may increase or decrease in proportion to the number of job transitions between corresponding nodes. For example, if the edge weight value for a first edge from node A to node B is equal to 1200 and the edge weight value for a second edge from node B to node A is equal to 800 and the clustering threshold is set to 10%, then nodes A and B may be clustered if the absolute difference of edge weight values is below 200 (10% of 1200+800). Here, the absolute difference between the first and second edge is 400 (1200–800), which means that the difference in edge weight values is above the clustering threshold and nodes A and B would not be clustered. In yet other embodiments, the clustering threshold value may be based on a percentage of the node sizes. For example, if node A has a size of 2100 and node B has a size of 2900 and the clustering threshold is set to 10%, then nodes A and B may be clustered if the absolute difference of edge weight values is below 500 (10% of 2100+2900). Using the above example, the absolute difference between the first and second edge is 400 (1200–800), which means that the difference in edge weight values is below the clustering threshold and nodes A and B would be clustered.

Processing Overview

Figure 3:
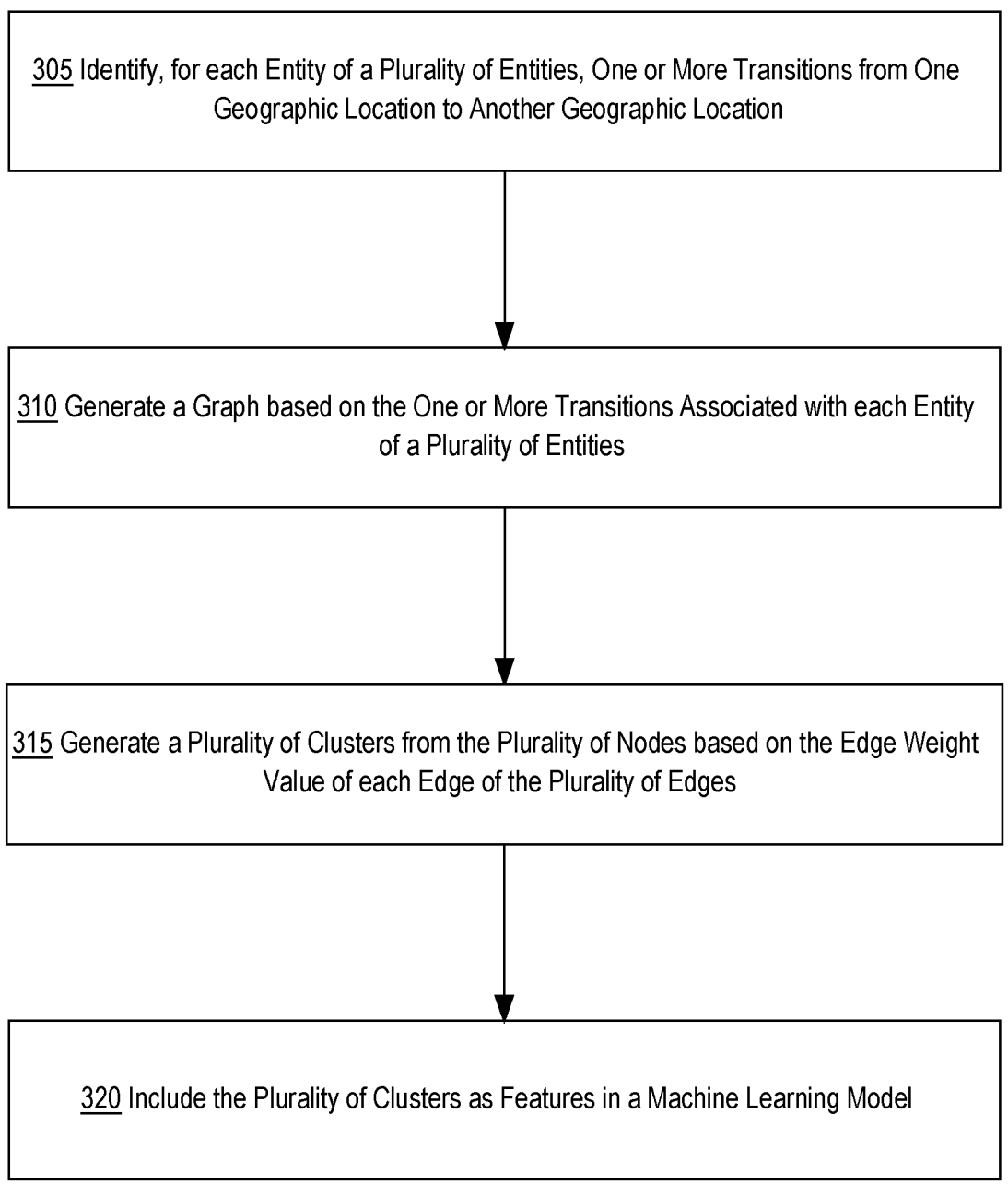
FIG. 3 is an example flowchart for generating a graph that includes clustered nodes clustered based on edge weight values of directional edges, in an embodiment.

FIG. 3 depicts an example flowchart for generating a graph that includes clustered nodes clustered based on edge weight values of directional edges. Process 300 may be performed by a single program or multiple programs. The operations of the process as shown in FIG. 3 may be implemented using processor-executable instructions that are stored in computer memory. For purposes of providing a clear example, the operations of FIG. 3 are described as performed by the optimized graph generation system 205 and its components. For the purposes of clarity process 300 is described in terms of a single entity. In an embodiment, the operations and described examples of FIG. 3 are described in terms of the feature attribute type job location. Other embodiments and examples may include other geographic locations, such as entity residence, or any other feature attribute type including, but not limited to, job type, experience types, education, purchase history, or any other measurable features related to the plurality of entities.

In operation 305, process 300 identifies, for each entity on the plurality of entities, one or more transitions from one geographic location to another geographic location. In an embodiment, the entity data retrieval service 210 may retrieve entity data from the data store 230. The entity data may include entity profile property values. For example, the entity profile property values may represent job location history for each job held by each entity. For example, entity A may have held the following jobs: first engineering job (located in San Jose), second engineering job (located in San Francisco), and third engineering job (located in Mountain View). The entity data retrieval service 210 may determine that entity A has job locations corresponding to San Jose, San Francisco, and Mountain View. Job transitions for entity A may be represented as: 1) San Jose to San Francisco and 2) San Francisco to Mountain View.

In other embodiments, the entity data retrieval service 210 may retrieve different types of entity data from the data store 230 based upon the type of graph to be generated. For example, if the graph to be generated is a graph of entity residences and transitions between residences, then the entity data retrieved may include feature attribute values indicating residence location information for each of the entities in the plurality of entities. In other examples, if the graph to be generated is a graph of purchase transaction history, then the entity data retrieved may include feature attribute values related to purchase history of items purchased by entities, include which items were purchased, when the transaction occurred, and transaction details including the amount and seller information.

Graph Generation

In operation 310, process 300 generates a graph based on the one or more transitions associated with each entity of the plurality of entities. In an embodiment, the graph generation service 215 generates a directional graph of nodes and edges based upon the entity data retrieved by the entity data retrieval service 210. In an embodiment, if the entity data retrieved includes job location and job transition history, then the graph generation service 215 may generate a plurality of nodes that each represent a geographic job location.

In an embodiment, a plurality of edges may be generated to connect the plurality of nodes within the graph. The plurality of edges may be directional edges that each represent a transition from one geographic job location to another geographic job location. In an embodiment, each of the edges may have an associated edge weight value that may represent an aggregated number of transitions by entities from one node to another node. For example, referring to FIG. 4A, edge 430-1 may have an edge weight value of 100, which may represent 100 unique job transitions by entities from a job located in Sunnyvale (node 415) to a job located in San Jose (node 405). In another embodiment, edge weight values may incorporate the recency of the transition, such that job location transitions that are more recent in time are given more weight than job location transitions that occurred further in the past. For example, job location transitions that occurred within a 6-month time period may be given a full weight, while job location transitions that occurred between 6-months and one year ago may only be given 80% weight. Job location transitions that occurred greater than a year ago may be given only 50% weight. Recency of transition weight factors may be configurable based upon time windows and their respective weight.

Graph Pre-Processing

The graph generation service 215 may pre-process the entity data, from the entity data retrieval service 210 prior to generating the graph. In an embodiment, the graph generation service 215 may implement a node dropping threshold that defines a minimum size for nodes. The minimum size of a node may be defined as a minimum number of associated entities that have a particular job location. For example, the entity data for the plurality of entities may have 1 million instances where the job location value for entities was equal to San Jose (node 405), 500,000 instances where the job location value for entities was equal to Sunnyvale (node 410). If the node dropping threshold is set to the value 200 and if a particular job location value, e.g. East Sunnyvale, has less than 200 associated instances for entities equal to the particular job location, then the graph generation service 215 may drop the particular job location value and as a result not create a node for East Sunnyvale. By doing so, the graph generation service 215 may eliminate outlier entity data for job locations that are grossly underrepresented and reduce the overall dimensions for the graph prior to clustering.

In another embodiment, if the particular job location value does not meet the minimum number of associated entities as defined by the node dropping threshold, then the graph generation service may merge the particular location value to the nearest job location value that does meet the minimum number of associated entities. For example, the particular job location value for East Sunnyvale may be merged to the nearest job location value (Sunnyvale). The result of the merge is that node 415 (Sunnyvale) will represent associated entities that have the job location value of Sunnyvale and East Sunnyvale.

In an embodiment, the graph generation service 215 may implement an edge dropping threshold that may be used to evaluate edges between nodes to determine whether the edge meets a minimum size value. For example, graph generation service 215 may analyze each edge to determine whether their corresponding edge weight value meets the minimum weight value defined by the edge dropping threshold. If an edge weight value is below the threshold then the edge may not represent statistically significant job transitions and as a result may be removed in order to reduce the overall number of edges processed during clustering operations.

In an embodiment, the graph generation service 415 may remove edges that connect to the same node. This may occur if entity data indicates a job transition from one job to another job where both jobs are located within the same job location. Since the edge connects the same node to itself, clustering a node with itself is not possible. As a result, the graph generation service 415 as part of pre-processing may remove edges that connect nodes to themselves.

Node Clustering

Figure 5:
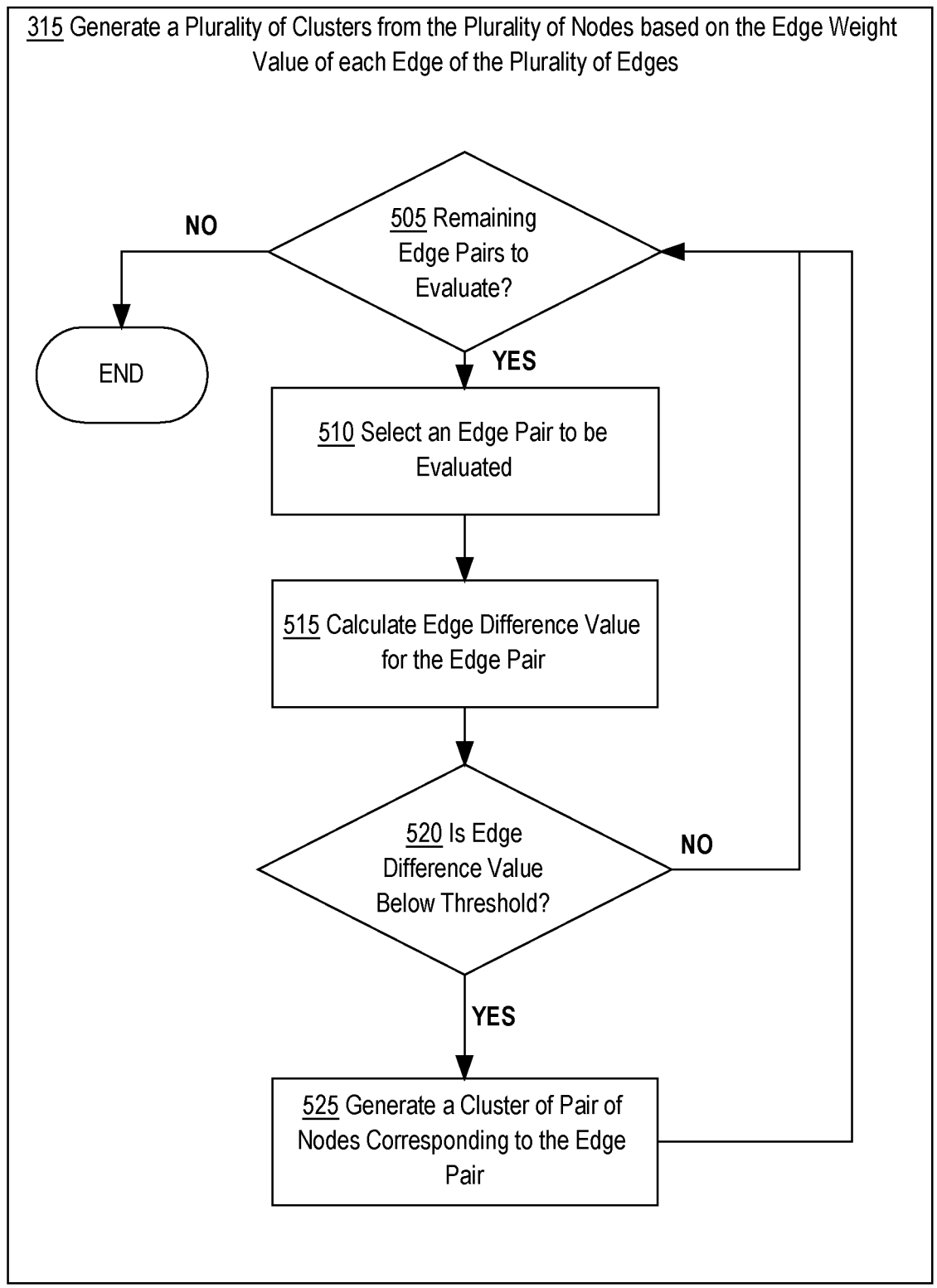
FIG. 5 is an example flowchart for generating a plurality of clusters from a graph, in an embodiment.

Referring to FIG. 3 in operation 315, process 300 generates a plurality of clusters from the plurality of nodes based on the edge weight value of each edge on the plurality of edges. In an embodiment, the node clustering service 220 analyzes the nodes and edges in a graph generated by the graph generation service 215 and identifies nodes that may be clustered to generate a plurality of clusters based upon the edges connecting the plurality of nodes. FIG. 5 depicts an example flowchart for generating a plurality of clusters from a graph by of the node clustering service 220. Process 500 may be performed by a single program or multiple programs. The operations of the process as shown in FIG. 5 may be implemented using processor-executable instructions that are stored in computer memory. For purposes of providing a clear example, the operations of FIG. 5 are described as performed by the node clustering service 220. For the purposes of clarity process 500 is described in terms of a single entity.

In an embodiment, the node clustering service 220 receives the graph generated by the graph generation service 215 in order to generate a plurality of clusters from the plurality of nodes in the received graph. In operation 505, process 500 determines whether there are remaining edge pairs to evaluate for clustering corresponding nodes. In an embodiment, the node clustering service 220 iterates through each edge pair between pairs of nodes to determine whether the pairs of nodes should be clustered to generate a clustered node. If there are remaining edge pairs to evaluate, then process 500 proceeds to operation 510. If, however, there are no remaining edge pairs to evaluate, then process 500 ends.

In operation 510, process 500 selects an edge pair from the plurality of edges in the graph. In an embodiment, node clustering service 220 selects an edge pair from the graph. For example, referring to FIG. 4A, the node clustering service 220 may select edges 430-1 and 430-2, which are edge pairs because edges 430-1 and 430-2 connect nodes 405 and 415.

In operation 515, process 500 calculates an edge difference value from the edge pair. In an embodiment, the node clustering service 220 calculates an absolute difference value between edge weight values for the selected edge pair. For example, if the edge weight value for edge 430-1 equals 1000 and the edge weight value for edge 430-1 equals 950, then the node clustering service may calculate the absolute difference value to equal 50 (abs($1000_{430-1} - 950_{430-2}$).

In operation 520, process 500 determines whether the calculated edge difference value is less than the clustering threshold value. In an embodiment, the node clustering service 220 evaluates whether the calculated edge difference value is less than the clustering threshold value. If the calculated edge difference value is less than the clustering threshold value, then the node clustering service 220 may proceed to operation 525 to generate a cluster that corresponds to the pair of nodes. Using the above example, if the clustering threshold value is set to 100, then the node clustering service 220 would determine that the edge difference value is less than the clustering threshold value and proceed to operation 525. If, however, the calculated edge difference value is greater than the clustering threshold value, then the node clustering service 220 will not cluster the pair of nodes and may proceed back to operation 505 to determine whether there are remaining edge pairs to evaluate. For instance, if the clustering threshold value is set to 25, then the node clustering service 220 would determine that the edge difference value (which is 50) is greater than the clustering threshold value and proceed back to operation 505.

Figure 4B:
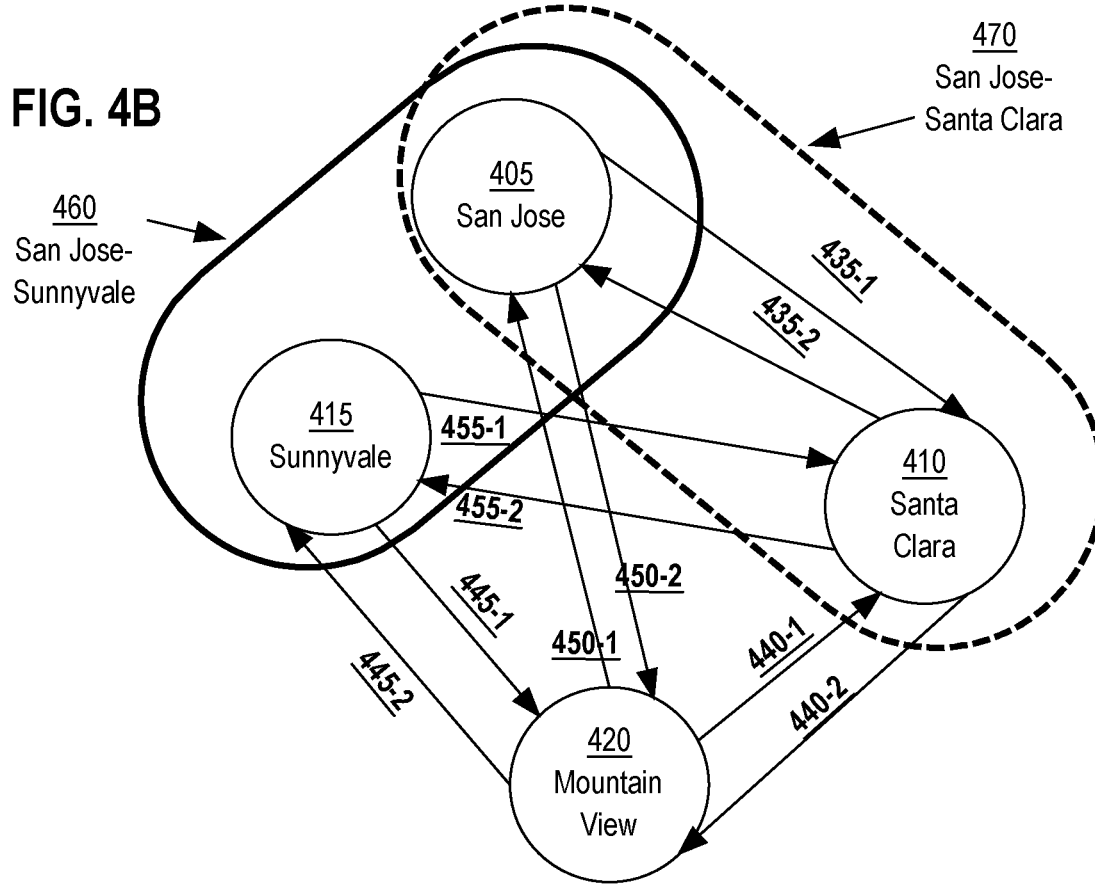
FIG. 4B is an example graph with a set of nodes, edges, and a clustered node, in an embodiment.

In operation 525, process 500 generates a cluster of the pair of nodes corresponding to the edge pair. In an embodiment, the node clustering service 220 generates a new node, which represents a cluster of the pair of nodes corresponding to the edge pair. FIG. 4B depicts an example graph with a set of nodes, edges, and a clustered node. Clustered node 460 represents a cluster of node 405 (San Jose) and node 415 (Sunnyvale). Upon generating the clustered node 460, process 500 proceeds back to operation 505.

In an embodiment, evaluating the remaining edge pairs may include edge pairs connected to nodes that are already part of a clustered node. For example, edge pair 435-1/435-2, which connect nodes 405 and 410, may also be evaluated to determine whether a clustered node should be generated for nodes 405 and 410 even though node 405 is already part of clustered node 460. For example, clustered node 470 may represent a clustered node generated from nodes 405 and 410, where the edge difference value for edge pair 435-1/435-2 was calculated to be less than the clustered threshold value.

In an embodiment, clustered nodes may contain more than two nodes, provided that edge pairs for each pair of connected nodes, within the cluster, have an absolute difference between corresponding edge weight values below the clustering threshold value. All nodes within a cluster must satisfy the following:

For every node i and node j in the same cluster $abs(\alpha_{i-j} - \alpha_{j-i}) < \gamma$ Upon evaluating all of the edge pairs, process 500 ends resulting in the generation of the plurality of clusters.

Incorporating into Machine Learning Model

Referring back to FIG. 3 in operation 320, process 300 includes the plurality of clustered nodes from the graph as features in the machine learning model. In an embodiment, the optimized graph generation system 205 sends the plurality of clusters, along with the non-clustered nodes, to the machine learning content selection service 240. The machine learning content selection service 240 takes the graph, with the plurality of clusters, and transforms the graph into a dataset of records to be used to train the machine learning model.

FIG. 6 illustrates examples of transforming feature attribute values into records for training the machine learning model implemented by the machine learning content selection service 240. Table 605 is a table of the feature attribute type job location transformed into records based upon a traditional one-hot-encoding feature transformation approach. The one-hot-encoding approach transforms each feature value into a categorical variable. Table 605 represents feature transformation for a graph where clustering was not performed. For example, each of the job locations represented by nodes 405, 410, 415, and 420 are transformed into separate binary variables represented by variables 620, 625, 630, and 635 respectively. Column 610 represents unique record IDs R1-R6. Record R1 represents node 405, which has variable 620 set to 1 because variable 620 represents node 405. The remaining variables 625-635 are set to zero. The dataset generated by implementing one-hot-encoding results in a sparse table which consumes significant storage resources. Each of the records R1-R6 only have one non-zero variable.

In contrast, table 640 is a table that represents feature transformation using a graph with clustered nodes represented by FIG. 4B. Clustered nodes 460 and 470 and node 415 are depicted by variables 655, 660, and 665 respectively. Column 645 represents unique record IDs R11-R13. Record R11 represents node 405, which has variable 655 and variable 660 set to 1. Variable 655 represents clustered node 460, which includes node 405, and variable 660 represents clustered node 470, which includes node 405. Record R12 represents node 405, which has variable 655 and variable 660 set to 1. Variable 655 represents clustered node 460, which includes node 405, and variable 660 represents clustered node 470, which includes node 405. Record R13 represents node 415, which has variable 655 and variable 660 set to 0 and variable 665 set to 1. Node 415 is not included in clustered nodes 460 and 470, as a result variable 655 and variable 660 are set to 0. The result of the feature transformation of the graph with clustered nodes, depicted in FIG. 4B is a table with 50% less records and is not a sparse table.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
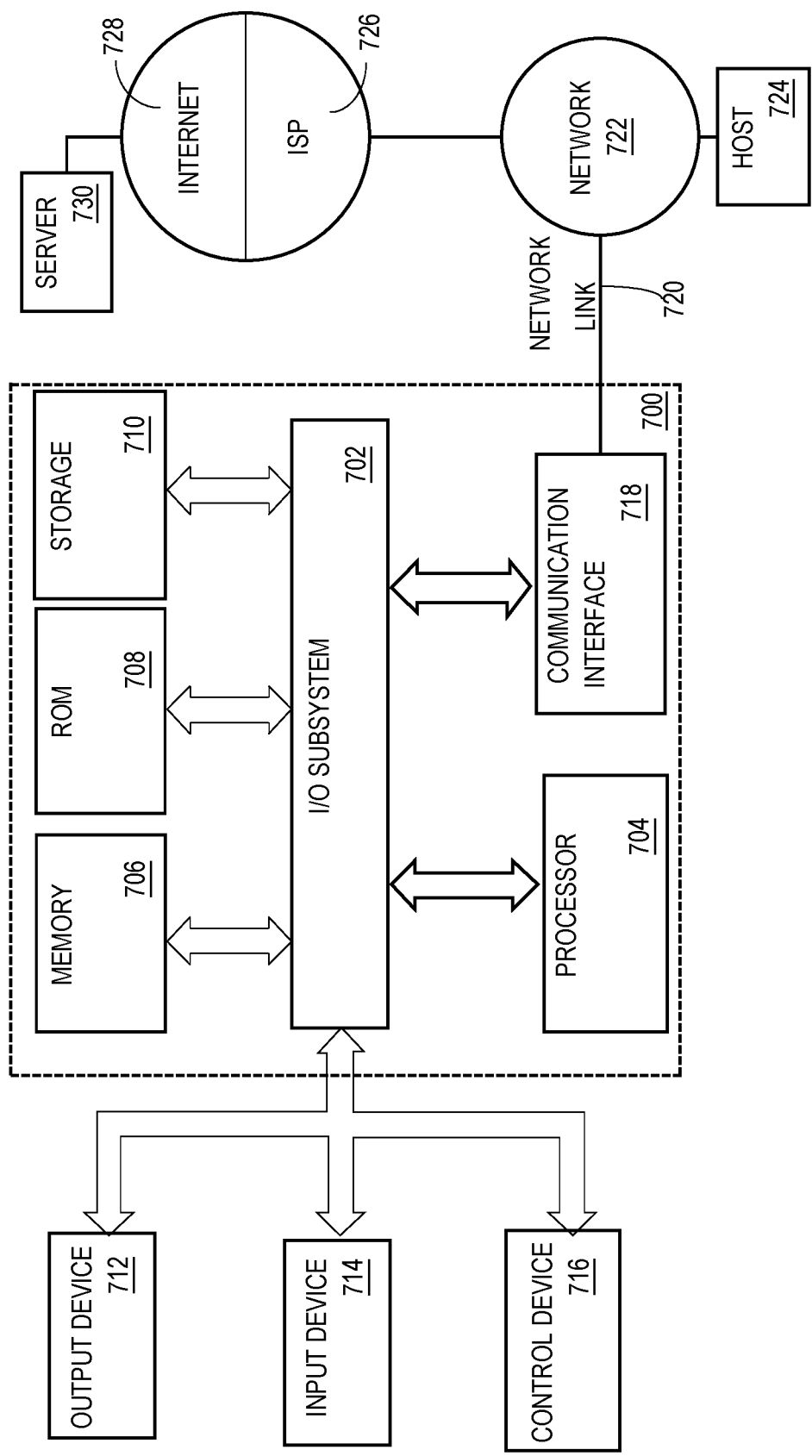
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   for each entity of a plurality of entities, identifying one or more transitions from one geographic location to another geographic location;
   generating a graph based on the one or more transitions associated with each entity of the plurality of entities;
   wherein the graph comprises a plurality of nodes representing geographic locations and a plurality of edges connecting the plurality of nodes;
   wherein each edge of the plurality of edges (1) connects two nodes of the plurality of nodes, (2) represents a transition from a geographic location represented by one of the two nodes to the other of the two nodes, and (3) represents an edge weight value that is based on an aggregated number of transitions between geographic locations represented by the two nodes;
   generating a plurality of clusters from the plurality of nodes based on the edge weight value of each edge of the plurality of edges; and
   training a machine learning model to perform content item selection, wherein the training of the machine learning model is done with a training dataset that includes feature values corresponding with the plurality of clusters.

2. The method of claim 1, wherein generating the graph based on the one or more transitions associated with each entity of the plurality of entities, comprises:
   for each geographic location of the geographic locations, determining a count of entities from the plurality of entities that are associated with said each geographic location;
   determining a subset of geographic locations of the geographic locations that have counts of entities that are below a dropping threshold that represents the minimum size for nodes in the graph;
   removing the subset of geographic locations from the geographic locations to be used to generate the graph; and
   after removing the subset of geographic locations from the geographic locations to generate a second subset of geographic locations, generating the graph based on the one or more transitions associated with each entity of the plurality of entities and the second subset of geographic locations.

3. The method of claim 1, wherein generating the graph based on the one or more transitions associated with each entity of the plurality of entities, comprises:
   for each specific geographic location of the geographic locations, determining a count of entities from the plurality of entities that are associated with the specific geographic location of the geographic locations;
   determining a subset of geographic locations of the geographic locations that have counts of entities that are below a dropping threshold that represents the minimum size for nodes in the graph; and
   for each geographic location in the subset of geographic locations:
   determining a nearby geographic location based on a distance between said geographic location and the nearby geographic location, wherein the nearby geographic location is part of the geographic locations and is not part of the subset of geographic locations; and
   assigning each of the entities that are associated with said geographic location to the nearby geographic location.

4. The method of claim 1, further comprising:
   upon generating the graph based on the one or more transitions associated with each entity of the plurality of entities, identifying one or more edges within the graph that have edge weight values below a dropping threshold that represents the minimum edge weight value for edges within the graph; and
   removing the one or more edges from the graph.

5. The method of claim 1, further comprising, for each edge of the plurality of edges:
   determining a first subset of transitions of the frequencies of transitions for said each edge that have transition timestamps older than a recency threshold, wherein the recency threshold is a range of time defining whether a transition is recent;
   assigning a first weight to each transition of the first subset of transitions;
   determining a second subset of transitions of the frequencies of transitions for said edge that have transition timestamps younger than the recency threshold;
   assigning a second weight to each transition of the second subset of transitions, wherein the second weight is larger than the first weight; and
   calculating the edge weight value for said edge as a sum of the first weights of the first subset of transitions and the second weights of the second subset of transitions.

6. The method of claim 1, wherein generating the plurality of clusters from the plurality of nodes based on the edge value of each edge, comprises:
   for each pair of edges connected to a pair of nodes within the graph:
   calculating an edge difference value as an absolute value of the difference between edge weight values of said pair of edges;
   determining whether the edge difference value is below a clustering threshold value, wherein the clustering threshold value defines whether the pair of nodes are to be clustered; and
   upon determining that the edge difference value is below the clustering threshold value, generating a cluster made up of the pair of nodes, wherein the cluster is part of the plurality of clusters.

7. The method of claim 6, wherein the clustering threshold value is based on a desired number of total nodes in the graph.

8. The method of claim 6, wherein the clustering threshold value is based upon a percentage of a sum of the edge weight values of said pair of edges.

9. A computer program product comprising:
   one or more non-transitory computer-readable storage media comprising instructions which, when executed by one or more processors, cause:
   for each entity of a plurality of entities, identifying one or more transitions from one geographic location to another geographic location;
   generating a graph based on the one or more transitions associated with each entity of the plurality of entities;
   wherein the graph comprises a plurality of nodes representing geographic locations and a plurality of edges connecting the plurality of nodes;
   wherein each edge of the plurality of edges (1) connects two nodes of the plurality of nodes, (2) represents a transition from a geographic location represented by one of the two nodes to the other of the two nodes, and (3) represents an edge weight value that is based on frequencies an aggregated number of transitions between geographic locations represented by the two nodes;
   generating a plurality of clusters from the plurality of nodes based on the edge weight value of each edge of the plurality of edges; and
   training a machine learning model to perform content item selection, wherein the training of the machine learning model is done with a training dataset that includes feature values corresponding with the plurality of clusters.

10. The computer program product of claim 9, wherein generating the graph based on the one or more transitions associated with each entity of the plurality of entities, comprises:
   for each geographic location of the geographic locations, determining a count of entities from the plurality of entities that are associated with said each geographic location;
   determining a subset of geographic locations of the geographic locations that have counts of entities that are below a dropping threshold that represents the minimum size for nodes in the graph;
   removing the subset of geographic locations from the geographic locations to be used to generate the graph; and
   after removing the subset of geographic locations from the geographic locations to generate a second subset of geographic locations, generating the graph based on the one or more transitions associated with each entity of the plurality of entities and the second subset of geographic locations.

11. The computer program product of claim 9, wherein generating the graph based on the one or more transitions associated with each entity of the plurality of entities, comprises:
   for each specific geographic location of the geographic locations, determining a count of entities from the plurality of entities that are associated with the specific geographic location of the geographic locations;
   determining a subset of geographic locations of the geographic locations that have counts of entities that are below a dropping threshold that represents the minimum size for nodes in the graph;
   for each geographic location in the subset of geographic locations:
   determining a nearby geographic location based on a distance between said geographic location and the nearby geographic location, wherein the nearby geographic location is part of the geographic locations and is not part of the subset of geographic locations;
   assigning each of the entities that are associated with said geographic location to the nearby geographic location.

12. The computer program product of claim 9, wherein the one or more non-transitory computer-readable storage media comprises further instructions which, when executed by the one or more processors, cause:
   upon generating the graph based on the one or more transitions associated with each entity of the plurality of entities, identifying one or more edges within the graph that have edge weight values below a dropping threshold that represents the minimum edge weight value for edges within the graph; and
   removing the one or more edges from the graph.

13. The computer program product of claim 9, wherein the optimized graph generation system performs further operations comprising, for each edge of the plurality of edges:
   determining a first subset of transitions of the frequencies of transitions for said each edge that have transition timestamps older than a recency threshold, wherein the recency threshold is a range of time defining whether a transition is recent;
   assigning a first weight to each transition of the first subset of transitions;

determining a second subset of transitions of the frequencies of transitions for said edge that have transition timestamps younger than the recency threshold;

assigning a second weight to each transition of the second subset of transitions, wherein the second weight is larger than the first weight; and calculating the edge weight value for said edge as a sum of the first weights of the first subset of transitions and the second weights of the second subset of transitions.

14. The computer program product of claim 9, wherein generating the plurality of clusters from the plurality of nodes based on the edge value of each edge, comprises:

for each pair of edges connected to a pair of nodes within the graph:

calculating an edge difference value as an absolute value of the difference between edge weight values of said pair of edges;

determining whether the edge difference value is below a clustering threshold value, wherein the clustering threshold value defines whether the pair of nodes are to be clustered; and upon determining that the edge difference value is below the clustering threshold value, generating a cluster made up of the pair of nodes, wherein the cluster is part of the plurality of clusters.

15. The computer program product of claim 14, wherein the clustering threshold value is based on a desired number of total nodes in the graph.

16. The computer program product of claim 14, wherein the clustering threshold value is based upon a percentage of a sum of the edge weight values of said pair of edges.

17. A system comprising:

one or more computer processors;

an optimized graph generation system coupled to the one or more processors, wherein the optimized graph generation system performs operations comprising:

for each entity of a plurality of entities, identifying one or more transitions from one geographic location to another geographic location;

generating a graph based on the one or more transitions associated with each entity of the plurality of entities;

wherein the graph comprises a plurality of nodes representing geographic locations and a plurality of edges connecting the plurality of nodes;

wherein each edge of the plurality of edges (1) connects two nodes of the plurality of nodes, (2) represents a transition from a geographic location represented by one of the two nodes to the other of the two nodes, and (3) represents an edge weight value that is based on an aggregated number of transitions between geographic locations represented by the two nodes;

generating a plurality of clusters from the plurality of nodes based on the edge weight value of each edge of the plurality of edges; and training a machine learning model to perform content item selection, wherein the training of the machine learning model is done with a training dataset that includes feature values corresponding with the plurality of clusters.

18. The system of claim 17, wherein generating the graph based on the one or more transitions associated with each entity of the plurality of entities, comprises:

for each geographic location of the geographic locations, determining a count of entities from the plurality of entities that are associated with said each geographic location;

determining a subset of geographic locations of the geographic locations that have counts of entities that are below a dropping threshold that represents the minimum size for nodes in the graph;

removing the subset of geographic locations from the geographic locations to be used to generate the graph; and after removing the subset of geographic locations from the geographic locations to generate a second subset of geographic locations, generating the graph based on the one or more transitions associated with each entity of the plurality of entities and the second subset of geographic locations.

19. The system of claim 17, wherein generating the graph based on the one or more transitions associated with each entity of the plurality of entities, comprises:

for each specific geographic location of the geographic locations, determining a count of entities from the plurality of entities that are associated with the specific geographic location of the geographic locations;

determining a subset of geographic locations of the geographic locations that have counts of entities that are below a dropping threshold that represents the minimum size for nodes in the graph;

for each geographic location in the subset of geographic locations:

determining a nearby geographic location based on a distance between said geographic location and the nearby geographic location, wherein the nearby geographic location is part of the geographic locations and is not part of the subset of geographic locations; and assigning each of the entities that are associated with said geographic location to the nearby geographic location.

20. The system of claim 17, wherein the optimized graph generation system performs further operations comprising:

upon generating the graph based on the one or more transitions associated with each entity of the plurality of entities, identifying one or more edges within the graph that have edge weight values below a dropping threshold that represents the minimum edge weight value for edges within the graph; and removing the one or more edges from the graph.

* * * * *